Figure 1:
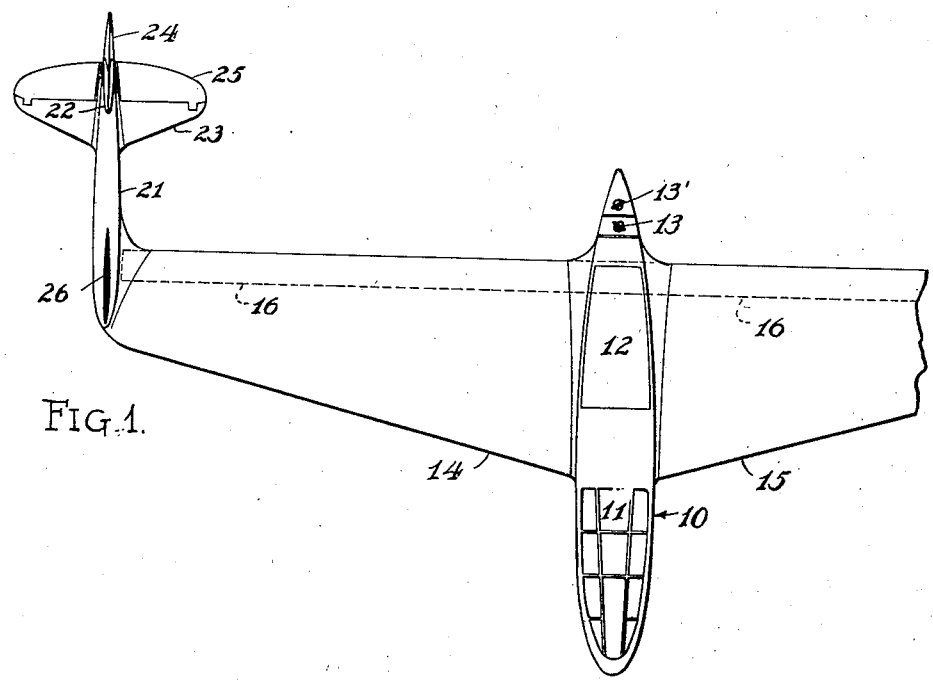

Aug. 17, 1943.                D. R. BERLIN                    2,326,819
                                AIRPLANE
                           Filed Aug. 28, 1940

INVENTOR
DONOVAN R. BERLIN
BY
ATTORNEY

Patented Aug. 17, 1943

2,326,819

UNITED STATES PATENT OFFICE 2,326,819

AIRPLANE

Donovan R. Berlin, Eggertsville, N. Y., assignor to Curtiss-Wright Corporation, a corporation of Delaware Application August 28, 1940, Serial No. 354,503

5 Claims. (Cl. 244—13)

This invention relates to a type of aircraft wherein the wings, control elements, body and power plant are arranged in a novel manner with respect to each other.

An object of the invention is to provide a "tailless" aircraft, without the excessive inherent stability which has been common to many such craft, and further to provide means thereon to afford adequate controllability. A further object is to provide an aircraft having a wide speed range, with low landing and take-off speed and high flight speed. Another object is to provide an aircraft from which crew and passengers may enjoy a wide range of uninterrupted visibility.

Figure 2:
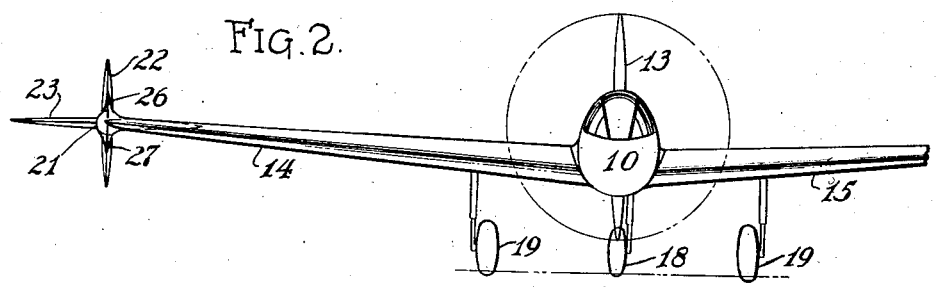
Figure 3:
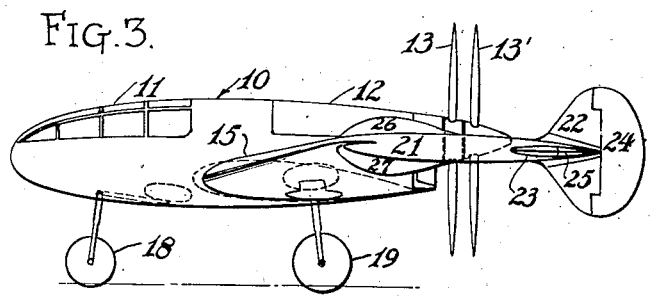

Further objects will appear while reading the following detailed description in connection with the drawing, in which:

Fig. 1 is a plan of the aircraft;
Fig. 2 is a front elevation; and
Fig. 3 is a side elevation.

A central streamlined body or nacelle 10 carries cabin quarters forward as at 11, and an engine compartment 12, aft. The engine drives a pusher propeller 13 at the rear end of the nacelle, which may be tandemed with another propeller 13'. From the lower parts of the nacelle sides, laterally extending wings 14, 15 project, these being tapered cantilever wings having swept back leading edges and substantially straight-across trailing edges, as shown. One or more lowerable landing flaps 16 are carried at the wing trailing edges, these flaps being coextensive with the wing span.

The nacelle carries a tricycle retractable landing gear consisting of a front steerable wheel 18 and laterally spaced rear wheels 19 disposed below and rearward of the aircraft center of gravity.

At the outer end, or tip, of each wing 14 and 15, an elongated streamlined boom 21 is secured, each boom starting substantially at the leading edge of its wing and extending rearwardly of the trailing edge thereof—rearwardly, in fact, of the transverse plane of the propellers 13 and 13'. A vertical fin 22 and a horizontal stabilizer 23 are rigidly secured to the rear end of each boom, and to the trailing edges thereof, a rudder 24 and an elevator 25 are respectively hinged, these airfoils lying rearwardly of the propeller plane. Control cables or apparatus of known character are led from the hinged airfoils to the cabin 11, and are arranged so that the two rudders 24 are moved jointly in the same direction, and so that the two elevators 25 may be selectively moved together in the same direction to act as elevators, and in opposite directions to act as ailerons.

At the forward ends of the booms, vertical anti-end-loss fins 26 and 27 are installed, coextensive with the wing tip chord, but these may be eliminated, if desired, since the booms 21 are thicker than the wing tips and themselves serve to some extent as end loss preventers.

It will be noted that the occupants of the cabin 11 have a very wide range of vision forward and laterally, with no interference from tractor nacelles and other forward protuberances. The wing is effective throughout its entire span, and complex tail or empennage structure is avoided. By the consolidation of the elevator function with the ailerons, one or more hinged flaps are done away with. In virtue of locating all the control surfaces at the wing tips, the surfaces may be made much smaller than on the conventional tail type aircraft as long moment arms are afforded by the wing semi-spans. The wings may be strengthened as necessary over conventional practice to assume the added control loads transmitted through them.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. In aircraft, a central body having a propeller, wings extending laterally out from said body, a streamlined boom mounted adjacent to the tip of each wing and extended rearwardly beyond the trailing edge thereof from a point adjacent to the wing leading edge, said booms being thicker than the wing tips to extend respectively above and below the top and bottom surfaces thereof to function as end plates tending to eliminate wing-tip losses, and an independent set of horizontal and vertical stabilizers mounted at the rear end of each boom.

2. In aircraft, a streamlined body having a propeller at its rearward end, swept-back wings extending laterally out from said body adjacent to its rearward end, an elongated streamlined boom mounted adjacent to the tip of each wing and extended rearwardly beyond the trailing edge thereof from a point adjacent to the wing leading edge, said booms being thicker than the wing tips to extend respectively above and below the top and bottom surfaces thereof to function as end plates tending to eliminate wing-tip losses, and a vertical and horizontal control surface mounted at the rearward end of each boom.

3. In aircraft, a streamlined body having a propeller at its rearward end, swept-back wings extending laterally out from said body adjacent to its rearward end, each wing having a rearwardly inclined leading edge and a trailing edge substantially perpendicular to said body, an elongated streamlined boom mounted adjacent to the tip of each wing and extending rearwardly beyond its trailing edge from a point adjacent to the wing leading edge, a trailing edge lowerable landing flap carried by each wing, each flap being substantially coextensive with its associated wing from body to boom, and a vertical and horizontal stabilizer mounted at the rearward end of each boom.

4. In aircraft, a laterally extending wing on each side of the fore-and-aft axis of the aircraft, the leading edge of each wing being swept back and the trailing edge thereof being substantially straight, a rearwardly extending boom mounted at the outer end of each wing, a trailing edge lowerable landing flap carried by each wing, each flap extending uninterruptedly from the inner wing-end outwardly to the boom carried by said wing, and a vertical and horizontal control surface mounted at the rearward end of each boom.

5. In aircraft, a body having a pusher propeller, tapered wings extending laterally out from said body, each wing having a trailing edge lying forward of said propeller, fins mounted adjacent to the tip of each wing to prevent wing-end losses, said fins being extended respectively above and below the wing tips, a boom mounted at the outer end of each wing to extend rearwardly beyond the trailing edge thereof, and a vertical and horizontal control surface mounted at the rearward end of each boom aft of the plane of rotation of the propeller and substantially coplanar with the wing tip fins and wings respectively.

DONOVAN R. BERLIN.